United States Patent

Jung et al.

Patent Number: 5,141,989
Date of Patent: Aug. 25, 1992

[54] SCREEN-PRINTABLE ACRYLATE PRESSURE-SENSITIVE ADHESIVE COMPOSITION

[75] Inventors: Dieter Jung, Moers; Katharina J. Bischof nee Mitrowsky, Dusseldorf; Kai Grimmel, Hilden, all of Fed. Rep. of Germany; Robert R. L. Smolders, Merksem, Belgium

[73] Assignee: Minnesota Mining and Manufacturing Company, St. Paul, Minn.

[21] Appl. No.: 624,397

[22] Filed: Dec. 7, 1990

[30] Foreign Application Priority Data

Dec. 21, 1989 [DE] Fed. Rep. of Germany ....... 3942398

[51] Int. Cl.$^5$ ............................................. C08L 31/02
[52] U.S. Cl. .................................. 524/561; 428/355; 524/378
[58] Field of Search ....................... 524/561, 560, 378; 428/355

[56] References Cited

U.S. PATENT DOCUMENTS

| | | | |
|---|---|---|---|
| 3,607,816 | 6/1968 | Holzer et al. | 524/378 |
| 3,617,362 | 11/1971 | Bemmels et al. | 117/122 |
| 3,707,518 | 12/1972 | Bemmels et al. | 260/29.6 NR |
| 3,740,366 | 6/1973 | Sanderson et al. | 260/29.6 M |
| 4,077,926 | 3/1978 | Sanderson et al. | 260/29.6 TA |
| 4,418,120 | 11/1983 | Kealy et al. | 428/355 |
| 4,587,152 | 5/1986 | Gleichenhagen et al. | 428/195 |
| 4,737,559 | 4/1988 | Kellin et al. | 526/291 |

FOREIGN PATENT DOCUMENTS

| | | |
|---|---|---|
| 60032869 | 2/1985 | Japan . |
| 62048780 | 3/1987 | Japan . |
| 297416 | 11/1989 | Japan . |

OTHER PUBLICATIONS

CRC "Handbook of Chemistry and Physics", 62nd ed. Dipole Moments for Molecules, p. E-62, 1981-1982.

Primary Examiner—Paul R. Michl
Assistant Examiner—Tae H. Yoon
Attorney, Agent, or Firm—Gary L. Griswold; Walter N. Kirn; James V. Lilly

[57] ABSTRACT

Screen-printable acrylate pressure-sensitive adhesive composition suitable for adhesive products having simultaneously, and independently from temperature, high values of adhesion, peel strength and shear strength as well as a high water and humidity resistance, comprising
(A) about 25 to 225 parts by weight of at least one dissolved inherently tacky pressure-sensitive adhesive selected from non-crosslinked (meth)acrylic ester/-(meth)acrylic acid copolymers having an average molecular weight corresponding to an inherent viscosity of not more than 1.0 dl/g; and
(B) 100 parts by weight of an organic solvent or solvent mixture having a low partial vapor pressure of less than about 3 kPa (30 mbar) at 20° C. and a dipole amount of at least 1.0 Debye. The acrylate copolymer preferably has structural units of the formula

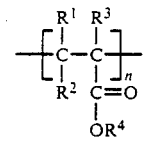

wherein $R^1$ and $R^2$ independently are hydrogen or lower alkyl having 1 to 4 carbon atoms; $R^3$ is hydrogen, a lower alkyl group having 1 to 4 carbon atoms and a cyano group; and $R^4$ is hydrogen or an alkyl group having 1 to 14 carbon atoms, n is the average degree of polymerization, subject to $R^4$ being a hydrogen atom in at least 5 weight % of the total monomer units, one of groups $R^1$ and $R^2$ optionally being carboxyl of the formula $-C(=O)-OR^4$ and $R^3$ optionally being a methylene carboxyl group having the formula $-CH_2-C(=O)-OR^4$.

19 Claims, No Drawings

SCREEN-PRINTABLE ACRYLATE PRESSURE-SENSITIVE ADHESIVE COMPOSITION

TECHNICAL FIELD

The invention relates to the screen printing of acrylate pressure-sensitive adhesives suited for adhesive products having high stability against water and moisture and high levels of adhesive power, stripping strength and shear adhesion regardless of temperature. In particular, it relates to an improved acrylate screen-printable pressure-sensitive adhesive composition in the form of a solution and to a process particularly suited for making said composition. Further, it relates to corresponding screen prints.

BACKGROUND ART

Screen printing is a printing process using a fine-mesh screen (clear widths on the order of 150 to 400 µm, corresponding to a filament number of 30 to 200 per inch) and possibly a stencil which is used particularly for large-area supporting sheets of paper, plastic films or foils, metal foils, glass sheets and the like. A viscous ink or printing composition is placed on the screen and distributed over it by means of a doctor blade. In their simplest form, the machines and equipment developed for performing this process include a conventional printing table with the stencil mounted hingedly on top of the platen. A doctor blade is driven manually or electrically to squeeze the ink or screen printing composition through the screen onto a substrate. In case a great number of prints is to be provided, automatic screen printing machines are used to position the supporting substrate sheets and to squeeze the composition through the screen in a fully automatic manner. Horizontal screens are used in flat-bed printers. In cylinder screen printers, the screen is wrapped around a cylinder and is provided with the printing composition from the inside out. Modern screen printing machines turn out on the order of 2000 and more prints per hour. The screen printed sheets are dried and may be chemically modified by, for example, crosslinking the ink or printing composition.

It has been known to use the screen printing process for coating backing sheets with pressure-sensitive adhesives (PSAs). For screen printing PSAs, a variety of compositions or formulations have been used in which the adhesive comprises an organic polymer product. Because of the stringent requirements particularly in high-performance screen printing, screen printing compositions must adhere firmly to the substrate to be coated.

Japanese Laid-Open Application 62 048 780 (Toa Gosei) describes water-dispersible pressure-sensitive adhesive compositions useful for rotary screen printing which are obtained by polymerizing in an aqueous medium a monomer mixture consisting of (meth)acrylic acid esters. Polymerization in an aqueous solution calls for the use of emulsifiers or dispersing agents. The polymers have a relatively high molecular weight and are dispersable, but not soluble in water any more. These (meth)acrylic acid ester polymers must have less than 10 weight % of monomers having polar groups. The glass transition temperature of the polymers is $-50°$ C. to $-30°$ C. These PSAs are particularly suited for use in rotary screen printing on substrates such as films, textiles and paper.

Japanese Laid-Open Application 60 032 869 (Toa Gosei) proposes PSAs suited for screen printing which consist of an aqueous dispersion of (meth)acrylic acid ester copolymers. The polymers are obtained by suspension or emulsion polymerizing in water a monomer mixture comprising at least 50 weight % (meth)acrylic acid esters, less than 10 weight % of a monomer having polar groups and not more than 50 weight % of another olefinically unsaturated monomer.

Japanese KOKAI Patent No. HEI 1(1989)-297416 discloses an pressure sensitive adhesive comprised of
(A) an acryl group copolymer having a weight average molecular weight of from 50,000 to 500,000, and 1 to 10 parts by weight per 100 parts by weight of copolymer (A) of a compound having two or more ethylenically unsaturated bonding sites in one molecule and having a molecular weight of less than 1,000, and
(B) an organic solvent having a boiling point range of from 100° C. to 250° C.

The copolymer of this KOKAI is prepared via a process in which a portion of the monomer charge (e.g., 20% by weight) is initially added to the reaction solvent after which the balance of the monomer charge is added dropwise while the entire reaction mixture is heated at 80° C. This reaction is exothermic and difficult to control. Applicants have found it impossible to produce a coatable or screen-printable adhesive via the teachings of this KOKAI. The polymer either gelled and phase separated or the exotherm was uncontrollable.

Although highly thixotropic PSAs are well suited for specialized screen printing applications such as pattern printing they have no particular utility for the production of screen prints which have a large area and particularly a smooth surface, since the printed compositions do not show an adequate flow-out or running behavior. Also, since the dispersing or emulsifying agents are wetted by water, the compositions are sensitive to water and moisture will migrate through the coating to the interface and be leached out. Prints of this kind are not water-resistant and do not exhibit the required long-term stability. If exposed for extended periods to outdoor conditions, a print will lose its integrity. Also, the prior PSA products do not exhibit an acceptable balance of adhesive power, tackiness and adhesion in shear.

Attempts have been made to test screen printing PSAs uses which are composed of 100% solids so as to obviate solvent problems. A number of PSAs commercially available at present are curable by radiation-induced crosslinking. Their disadvantage is that they require the use of expensive and toxic monomers such as acryl and polyester monomers so that the residual monomers in the adhesive coating raise considerable toxicity and disposal problems. It has also been found also that these solid PSA compositions do not have the required adhesion in shear.

In DE-OS 33 46 100, a pressure-sensitive adhesive having properties of being releasable without residues is printed on a sheet material (screen printing is possible) by applying spaced cap-shaped adhesive sites having a prescribed diameter from a high solids content adhesive suspension. The adhesive is a highly concentrated aqueous dispersion on the basis of (meth)acrylic acid esters and includes very small amounts of other monomers. The cap-shaped adhesive sites are crosslinked, preferably by electron beams. In preparing the acrylic polymers, an anionic emulsifier (sodium salt of an ethoxylated sulphonated nonylphenyl) is used to make possible a polymerization of the monomers in the aqueous medium. In practice, the polymerization is performed in two stages, with a material such as 2-ethylhexylacrylate being added in time staggered amounts. The polymer dispersion is printed right away onto a random-fiber fabric or a foil using a gravure or screen printing system. The crosslinking agent is a bifunctional monomer (butanedioldiacrylate) which is incorporated in the PSA composition in the polymerization process and presumably undergoes some pre-reaction at that time already. A partial crosslinking of this kind during polymerization certainly is not undesirable as the adhesive composition of the cap-shaped sites is desired to be highly thixotropic. The molecular weight of acrylester polymers produced in an aqueous dispersion has been known to be fairly high.

The use of aqueous emulsifiers, which are present in the resultant screen print, is one of the causes of the water and moisture sensitivity of the PSA compositions of DE-OS 33 46 100. The adhesive cap is supposed to release and be removed easily. On the other hand, film-like continuous adhesive coatings are not possible with these prior pressure-sensitive adhesives.

Also available in the marketplace are adhesives based on caoutchouc or rubber which for screen printing uses are dissolved in an unpolarized aromatic solvent such as xylene. The handling of the solvents is hazardous, and they give rise to numerous disposal problems. The stability of the screen printed adhesive compositions against aging is unsatisfactory, and their handling gives rise to considerable cleaning problems. At elevated temperatures, adhesive and shear strengths are inadequate.

Copolymer PSAs based on (meth)acrylic acid and (meth)acrylic acid esters have been known for a long time. It has also been know to generate certain spectra of properties, as desired for a specific use, by judiciously selecting the composition of the pressure-sensitive adhesive. Unfortunately, many of the products offered by the adhesive industry are tailored to favor one property at the expense of all others. Copolymers of alkyl acrylate with a minor amount of acrylic acid are inherently tacky and do not require an additional tackifying resin. Further, their stability against aging is much superior to that of rubber resin-based PSAs. To this date, acrylate adhesive compositions are preferably made in an aqueous emulsion since this approach guarantees high concentrations and high molecular weights. As the first acrylate adhesives were somewhat sensitive to heat (cf. U.S. Pat. Nos. 3,617,362 and 3,707,518), it was contemplated to crosslink them (U.S. Pat. Nos. 3,740,366 and 4,077,926). Chromium(III) compounds, zinc octoate and others were used as crosslinking agents. Unfortunately, crosslinking causes some loss of tackiness; neither are the resultant adhesive and shear strength levels sufficient to justify a recommendation of these PSAs in high performance situations such as automobile components without problems.

U.S. Pat. No. 4,418,120 describes a PSA composition applied to a substrate. The PSA composition consists of isooctylacrylate or 2-ethylhexylacrylate and acrylic acid (3-7 parts by weight acrylic acid per 100 parts by weight of acrylic acid ester), a minor amount of an antioxidant and a rosin acid ester tackifying resin. The adhesive shows good adhesion to stainless steel, acrylonitrile/butadiene/styrene terpolymer (AsS), low-density polyethylene (LDPE) and isotactic polypropylene. The adhesive strength in shear is still very good at 70° C. For the production of this PSA composition, a solvent mixture of the copolymer is prepared in a nonpolar, highly volatile organic solvent, and the mixture is adjusted to an inherent viscosity of 0.75 to 1.5 dl/g. In practice, the viscosity is adjusted by adding solvents such as toluene to a much more viscous composition. The antioxidant is an inhibited phenol, the tackifier a rosin ester derivative. Prior to its application to a substrate, an organic solution of N,N'-bis-1,2-propyleneisophthalamide (also referred to as a bisamide) is added to the adhesive solution, and after its application to a substrate the coated structure is heated, whereby the solvent is removed and the acrylate adhesive is crosslinked. The acrylate adhesives are copolymers which may contain other monomers, such as itaconic acid, methacrylic acid, (meth)acrylamide, vinyl acetate and n-butyl-acrylate, only in minor amounts.

Nothing is reported regarding the screen printing of PSA products of this nature. Their use is likely to be problematic as the adhesive copolymer cannot be adjusted for elevated concentrations, the handling of toluene or benzene solutions in the printing phase is hazardous, and the removal and disposal of the solvent will give rise to considerable problems. The aforesaid prior patent is silent as to a maximation of the water and moisture stability of the products.

U.S Pat. No. 4,737,559 describes medical adhesive compositions suited for skin applications which comprises a copolymer of an acrylate or methacrylate ester of a non-tertiary alcohol having an average of 4 to 12 carbon atoms and a monoethylenically unsaturated aromatic ketone monomer (particularly p-acryloxybenzophenone). The copolymer may be polymerized by ultraviolet (UV) radiation, which also results in an adequate creep compliance. The initial adhesion to the skin is highly favorable and does not increase with time. It is possible to include with the acryl monomers another comonomer such as (meth)acrylic acid, itaconic acid, (meth)acrylamide, acrylonitrile, methacrylnitrile, vinyl acetate and N-vinylpyrrolidone. This patent is silent as to solvents, so that no conclusions can be drawn as to any suitability for screen-printing applications. Because of their extremely high molecular weight and the solvents taught as useful in the preparation, the adhesives disclosed in the patent are unlikely to be screen printable; rather, and as shown below, they are likely to have a tendency to "string".

DISCLOSURE OF THE INVENTION

The present invention provides a screen-printable PSA composition which enables PSA screen prints to be provided in a simple, rapid and reliable manner in a high performance printing process without complications and as far as possible without the use of hazardous solvents. The composition of the invention further provides an adhesive which when fixed or applied to a substrate, exhibits a temperature-independent balance of its mechanical strength and adhesion properties and additionally features a high stability against water and moisture so that the PSA may be used for outdoor applications such as in automobiles and provide bonds which last for several years.

To this end, the invention comprises a screen-printable acrylate pressure-sensitive adhesive composition essentially comprising (A) a dissolved polymeric solid comprising at least one acrylate copolymer and (B) a polar low molecular weight solvent in which said copolymer is dissolved. By "copolymer" is meant a polymer of at least two different monomer units, including binary, tertiary and quaternary polymers. Preferred for use in accordance with the invention are binary and tertiary copolymers wherein two or three different monomer units are present, respectively.

The invention also comprises a process of making the aforesaid via radical polymerization of the monomers used to prepare the type (A) polymer followed by isolation of the resultant polymer.

A further embodiment of the present invention comprises a screen printed substrates which utilizes the adhesive of the invention.

DETAILED DESCRIPTION

The essential problem in screen printing of polyacrylate solutions has been their tendency to string. Long-chained acrylate molecules form between the substrate to be printed and the screen stencil, a contact which is maintained in the form of strings when the stencil is raised from the substrate. These strings do not break when the stencil is raised. As a result, the printed pattern is totally destroyed. This also makes it impossible to continue the printing process and necessitates that the stencil be cleaned thoroughly. The phenomenon of stringing prohibits the continuous use of automatically operating machines.

The novel inventive acrylate PSA composition is eminently suited for screen printing since it combines the advantages of easy handling without problems on the screen with the spectrum of properties to be imparted to the finished bonded product, including stability against water and moisture. It is to be understood that the inventive PSA composition may of course be used for other purposes in which an adhesive has to meet similar demands as to its processing and the final product.

The copolymer forming the pressure-sensitive adhesive of the invention has inherent adhesion; at least, it is an acrylate copolymer which acts as an adhesive in combination with a tackifier. Preferably, the copolymer is represented by the formula

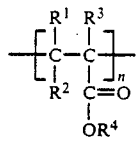

wherein $R^1$ and $R^2$ independently are hydrogen or lower alkyl having 1 to 4 carbon atoms; $R^3$ is hydrogen, lower alkyl having 1 to 4 carbon atoms or a cyano group, $R^4$ is hydrogen or an alkyl group having 1 to about 14 carbon atoms, and n is the mean degree of polymerization. Preferably at least 5 weight % of the monomer units correspond to the formula wherein $R^4$ is hydrogen. One of $R^1$ and $R^2$ may be carboxyl or carboxyalkyl having the formula $-C(=O)-OR^4$. $R^3$ may be methylene carboxyl having the formula $-CH_2-C(=O)-OR^4$.

The copolymer is preferably prepared via a process in which the monomers are dissolved in the reaction solvent at an elevated temperature. This results in a polymer wherein each of the monomer units is present as blocks of that unit.

Relative to 100 parts by weight of solvent, the copolymer is present in an amount of about 25 to 225 parts by weight, preferably about 50 to 175 parts by weight, so that the solids concentration of the screen printing composition may be clearly higher than 50 weight % without substantially impairing its screen printing properties.

At the screen printing stage, the copolymer has an inherent viscosity (IV) of not more than 1 dl/g and is essentially non-crosslinked, for no polymerizable polyfunctional prepolymerizing monomer compound such as diacrylate or the like is incorporated in the polymer in the polymerization process. Preferably, the copolymer has an IV of not more than 0.7 dl/g (more preferably from 0.3 to 0.7 dl/g) at the screen printing stage. Most preferably, the IV of the copolymer is in the range of from 0.4 to 0.6 dl/g at the screen printing stage. A particularly useful IV is one of about 0.45. This ensures a duplicatable provision of a screen printing composition which on passing a fine mesh screen (clear mesh widths on the order of 150 to 400 cm) does not string and, having been applied to a substrate, flows out quickly and smoothly to form a planar and even coating without spots, caps or raised sites which would substantially impair the transmission of light of transparent adhesive film products.

The term (meth)acrylate or (meth)acrylic acid expresses the fact that both the acrylic acid series ($R^3=H$ or CN) and the methacrylic acid series ($R^3=$ lower alkyl having 1 to about 4 carbon atoms) are included.

The lower alkyl (meth)acrylates herein may be methylacrylate, methylmethacrylate, ethylacrylate ethylmethacrylate, n-propylacrylate, n-propylmethacrylate, isopropylacrylate, isopropylmethacrylate, n-butylacrylate, n-butylmethacrylate, iso-butyl-acrylate, iso-butylmethacrylate, tert.-butylacrylate and tert.-butylmethacrylate.

The preferred tertiary copolymers of three different monomers preferably comprise (meth)acryl acid units and two different (meth)acrylic acid esters, with the total carbon number of the two ester alkyl groups preferably not exceeding 10. A favorable combination is present in the case of copolymers containing methyl(meth)acrylate and octyl(meth)acrylate, in which case the total carbon number in the ester alkyl is equal to 9.

It has been found that the (meth)acrylic acid units should provide a minimum amount to enable the full spectrum of properties of the PSA product to be adjusted. Preferably, at least 5 weight percent and particularly preferably 7.5 weight percent should be acid monomer units. Preferably, the higher alkylacrylate units are present in the same percentage as the sum of the (meth)acrylic acid units and the lower (meth)acrylic acid ester units. A variation within ±10% of this 1:1 ratio (on a molar basis) is still very advantageous.

The higher (meth)acrylate have at least 4 and generally an average of 4 to 14 carbon atoms; in the case of several monomers, this value is the mean. Examples of incorporated higher (meth)acrylates are the esters of monofunctional n-and iso-alkanols, particularly of n-hexylalcohol, n-heptylalcohol, n-octylalcohol, isooctylalcohol, 2-ethylhexylalcohol, nonylalcohol and isononylalcohol. A (meth)acrylate which is particularly suited is isooctylacrylate, especially in combination with methylmethacrylate and acrylic acid in a terpolymeric PSA.

Acrylic acid, methacrylic acid, cyanoacrylic acid, ethylacrylic acid, n-propylacrylic acid, isobutylacrylic acid, itaconic acid (methylene succinic acid $H_2C=C(COOH)-CH_2-COOH$), fumaric acid, maleic acid and others may be the acid monomer in the copolymer, with their percentages properly adjusted. The free acid may be present also in the form of an alkali salt or earth alkali salt. In most cases, the amount of such acid monomer units should not exceed 25 mole percent. The preferred acid monomer is acrylic acid.

The copolymer may incorporate minor amounts (up to 25 mole percent) of other ethylenically unsaturated monomers such as acrylamide, acrylonitrile, styrene, methylstyrene and the like as long as they do not disturb the properties of the adhesive.

In accordance with the invention, component B of the screen printable PSA composition cannot simply be considered "inert", since it enters into a temporary interaction with the acrylate copolymer which has decisive importance for the excellent screen printing behavior of the composition. The solvent is polar and has a relatively high dipole moment of at least 1.0 Debye; in general, it is a representative of the group comprising the higher-boiling liquids which at 20° C. have a relatively low vapor pressure, e.g., not more than 3 kPa. It is important, however, that the solvent evaporates practically completely in the subsequent drying prior to crosslinking treatment, should UV crosslinking be employed.

A particular advantage of the invention is that solvent B may, at the same time, be the medium in which the acrylate copolymer is made, preferably by radical solvent polymerization. Polar solvents are not normally used as polymerization media, as they tend to inhibit radical polymerization. In the present invention, this phenomenon is particularly advantageous in that it produces the desired low molecular weight.

A suitable group of these solvents are the high dipole moment ethers and esters having values of at least 1.0 Debye. At dipole moments below about 1.1 Debye, the performance of the screen printing adhesive starts to drop off considerably. Solvents having a dipole moment above 1.3 Debye are preferred. Most conveniently, solvents should be used which have been selected from the following group of compounds (the parenthesized dipole moments are given in Debye units): 1,2-ethyleneglycol (1.7), n-propylalcohol (1.66), n-butylalcohol (1.72), isobutylalcohol (1.51), 3-butylalcohol (1.67), 1-amylalcohol (1.63), 2-amylalcohol (1.66), 3-amylolalcohol (1.59), isoamylalcohol (1.05), dimethylethylcarbinol (1.66), pentaerythrite, furfurol (3.57), cyclohexanol (1.9), 2-methylcyclohexanol (1.95), 3-methylcyclohexanol (1.9), 4-methylcyclohexanol (1.87), the cresoles (1.4–1.57), benzyl alcohol (1.68), anisol (1.23), formic acid-n-propylester (1.89), propionic acid methyl ester (1.74), cyclopentanone (3.0), formic acid isobutylester (1.88), propionic acid ethyl ester (1.79), acetylacetone 2.9), methyl-n-butyl-ketone (2.70), methyl.tert.butyl ketone (2.79), mesityl oxide (2.80), formic acid-n-amylester (2.96), acetic acid-n-butyl ester (1.87), and other esters of the $C_1-C_6$ alcohols with lower fatty acids (meaning fatty acids having 1 to about 8 carbon atoms), acetacetic acid ethyl ester (2.93), oxalic acid diethyl ester (2.51), cycloheptanone (2.98), (1,3)-resorcine dimethylether (1.59), succinic acid diethyl ester (2.14), maleic acid diethyl ester (2.55), tartric acid diethyl ester (3.12), acetic acid o-cresyl ester (1.72), orthocarboxylic acid tetraethyl ester (1.1), brenzcatechol diethyl ether (1.37), phthalic acid dimethyl ester (2.5), phthalic acid diethylester (2.3), N,N-dimethyl formamide (4.2), N,N-dimethylacetamide, acetone nitrile (3.6), N-methylpyrrolidone, sulpholan, nitroethane (2.97), 1,1,2,2-tetrachloroethane, DMSO (5.0), pentachloroethane, and others.

Suitable solvents and their dipole moments are indicated in standard physical chemistry literature ("Taschenbuch for Chemiker und Physiker", D'Ans-Lax, CRC Handbook of Chemistry and Physics).

Preferred from the aforementioned group of solvents are the aliphatic ethers and high dipole moment esters, including their homologues not specified above.

Solvent mixture are likewise applicable, with the total dipole moment resulting incrementally from the individual dipole moments.

Examples of solvents that have turned out to be particularly suitable in practice are ethylene glycolmethylether (EG), propylene glycolmethylether (MOP) and diethylene glycolacetate.

It has been found that the interaction between the solvent and the copolymer is pronounced in the screen printing machine and stronger than the interaction between the molecules of the polymer, while the pressure-sensitive adhesive has sufficient inherent strength once the solvent has evaporated and the PSA has crosslinked. An accurate explanation of this phenomenon cannot be given.

It is particularly advantageous if both the polymerization of the copolymer and the formulation of the PSA composition use the same solvent B or at least a solvent from the same group. In addition, the use of the same solvent for polymerization and for the formulation is highly advantageous in that the PSA composition need not be isolated and prepared anew, since the composition can be provided from the polymerized solution without the copolymer having to be precipitated, isolated and dried.

This composition can then be screen-printed directly to a substrate. Typically, the composition has a viscosity of from 100 to 7,500 centipoise at the screen printing temperatures utilized (e.g., 10°-30° C.).

Further optional components of the inventive screen printing composition based on the solution of a PSA acrylate polymer in a polar solvent are additives such as pigments, dyes, viscosity builders, viscosity stabilizers, antioxidants, matting agents, inert fillers, antistatic agents and the like, of which the selection and amounts may readily be determined in accordance with the intended use. If, during screen printing, the PSA copolymer is to be crosslinked thermally or by UV radiation (methods preferred due to the possibility of a fine adjustment of properties they offer) a crosslinker component, of which the previously mentioned bisamide may be employed. An example of such a crosslinker is N,N'-bis-1,2-porpyleneisophthalimide. Other suitable crosslinkers are know to those in the art. The crosslinking reaction occurs between adjacent carboxyl and/or ester groupings of two different chains or in different position of the same chain, with new chemical bonds such as amide bonds being formed.

Crosslinking components may be provided separately, that is, as an individual component at the time crosslinking is to take place or, alternatively, they may be incorporated into the uncrosslinked acrylate polymer using the techniques disclosed in U.S. Pat. No. 4,737,559. A number of crosslinking components may be incorporated in this fashion. A class of materials useful as the crosslinking component includes the monoethylenically unsaturated aromatic monomers such as are disclosed in U.S. Pat. No. 4,737,559. These monomers are free of ortho-aromatic hydroxyl groups. Thus, only the ethylenically unsaturated group is copolymerizable with the other monomers.

Preferably, the amount of the cross-linking agent is in the range of about 0.01 to 2 parts (preferably 0.1 to 0.5 parts) by weight, relative to 100 parts of the copolymer. If crosslinking is effected using electron beams, no additional crosslinking agent is necessary.

In addition to the amount of the crosslinking agent, the extent of crosslinking is determined by the type of crosslinking agent employed, and the conditions utilized during crosslinking. For example, if a bisamide crosslinker is used, temperatures in the range of 70° C. to 120° C. and times of 5 to 15 minutes are preferred crosslinking conditions. If the crosslinker is incorporated into the acrylate polymer, then crosslinking can be achieved without the use of heat. For example, high-intensity UV lamps which provide a dosage of from 100–800 millijoules per square centimeter ($mj/cm^2$) are useful. The exact dosage is, of course, dependent upon the amount of crosslinker incorporated into the polymer. Thus, lower levels of the crosslinker necessitate the use of higher dosages, and vice-versa. For a typical level of incorporated crosslinker, a dosage of 160 $mj/cm^2$ is satisfactory.

The screen printing composition may additionally contain a tackifier, and particularly so in case the inherent tackiness of the acrylate copolymer is low. Particularly suited as tackifiers are the glycerin esters of highly stabilized rosin acids, the pentaerythritol esters of rosin acids (fully or partially hydrogenated) and the rosins themselves, which are generally known for use as tackifier resins. These tackifiers preferably have acid properties (acid value in the range of 7 to 12) and softening points in the range of about 20° C. to 110° C. The modification of adhesives and of adhesive properties with tackifying resins has been known from the prior art (see e.g., U.S. Pat. No. 4,418,120).

If present, the amount of the tackifier is about 20 to 80 parts by weight, relative to the weight of the copolymer. The tackifier makes the copolymer softer and influences its glass transition temperature (Tg).

The screen printable pressure-sensitive adhesives of the invention and the adhesive products made therefrom (e.g., adhesive films, adhesive tapes, adhesive-coated substrates such as sheets of glass, ceramics or metal) exhibit an excellent adhesive power and outstanding physical adhesive properties such as stripping and shear strength. The unusual balance of the properties of the adhesive products is evident not only at normal temperatures in the range of 15° to 25° C., but also at both temperatures markedly below the freezing point and at temperatures as high as 80° C. These properties substantially facilitate the application of backings coated with the pressure-sensitive adhesive to substrates and render such application substantially independent of ambient temperatures. Because of the stability of their properties with temperature, the adhesive products applied to a planar substrate surface are capable of accommodating temperature extremes to which a workpiece or component provided with a product may be exposed, and of doing so without failing or their functions degrading.

Furthermore, when applied to a substrate, the inventive adhesive products surprisingly exhibit an unusually high stability in the presence of moisture and water. Further, the adhesive products are resistant to aging so that the substrates to which they are applied will not show failure or degradation of adhesion for several years.

The invention lends itself to a broad variety of practical uses. A particularly important area is that of mechanical components, including automotive parts and building components' particularly where they are exposed to water (e.g., cars in car-wash installations) and precipitation such as rain, hail and snow as well as varying temperatures (summer-winter, hot and cold climate).

One particular use of such an adhesive is for mounting "showershield" foils in the automotive industry. Foils of this kind are bonded to the inner panel surface of an automobile door to prevent the ingress of water into the car body. Since it allows the adhesive area to be very small relative to the area of the showershields, screen printing is a process particularly economical to apply in this case. Also, this application requires absolute water resistance, as the adhesive will be contacted by water. The bonding strength should not drop below a minimum for a period of at least five years and within a temperature range of 20° C. to +80° C.

An additional application is for mounting membrane switch pads. In the past, it has been necessary for this application to stamp adhesive films to size, as commercial screenprinting adhesives failed to meet the stringent requirements this application raises. Also, there exist in the automotive industry uses for a screen-printable product in the area of automobile dash boards.

The following examples describe preferred embodiments of the invention for the provision of an acrylate copolymer and of a screen-printable composition using said copolymer. The screen printed PSA products were tested in accordance with the methods specified below and compared with two commercially available screen printing adhesive compositions on the basis of a gum resin in xylene (comparison example I) and of an aqueous acrylate emulsion (comparison example II).

The properties of the adhesive are measured according to time-tested standard procedures.

The peel strength test corresponds to a modification of the PSTC-1 test described in "Test Methods for Pressure Sensitive Tapes", 7th edition, Pressure Sensitive Tape Council, Glenview, Ill., 1976, wherein a 20 $g/m^2$ adhesive solids is coated on a sheet of polyethylene terephthalate. This laminate is divided into strips 15 cm long and 2.54 cm wide and then contacted with the substrate on which the adhesion is to be determined. The adhesive coats are pressed down against the substrate surface by running a 2.05 kg roll over them two times. The samples so prepared are stored (1) for 20 minutes at room temperature and (2) for 3 days at 50° C. One end of the tape is folded over 180° onto itself and the exposed section of the substrate is clamped between the top jaws of a tensile tester while the doubled-over adhesive tape is clamped between the bottom jaws. Thereafter, the jaws are pulled apart with a speed of 30.5 cm/min; the force required to peel the laminate from the substrate is measured in N/cm. An adhesive having a peel strength above 4 N/cm is considered acceptable.

The adhesive strength in shear (or holding power) of a laminated PSA product is measured by means of a modified PSTC-7. A 1.27 cm by 2.54 cm sample of the adhesive sheet product is affixed to a stainless steel plate sized 7.5 cm×20 cm. Then, the sample strip is positioned with its long dimension at an angle of 2° relative to vertical so that the rear surface of the plate includes a 178° angle with the extended adhesive tape product and the 2.54 cm dimension of the adhesive product extends in the vertical direction. The adhesive surface is loaded with a 1 kg weight for 15 min. The assembly is then placed in an oven held at 70° C., and a 0.5 kg weight is attached to the free end of the adhesive tape. Different forms of failure exist in the shear tests: (1) Cohesive failure, i.e., the adhesion to both surfaces is greater than the cohesion, the adhesive distributing between the plate and the substrate. (2) Pop-off failure, i.e., the cohesion is stronger than the adhesion, the adhesive remaining on the substrate while the plate stays free of adhesive residues. The time required for failure of the adhesive product to occur is measured in minutes until the adhesive tape falls down freely. In general, the screen printed adhesive products of the invention exhibit adhesive strengths in shear of at least about 5,000 minutes and in many forms more than 8,000 minutes. In contrast, the adhesive strength in shear of commercial PSA-based screen printing compositions is on the order of ten minutes or less, resulting in an adhesive strength of the inventive products which is improved by a factor of $10^3$ to $10^4$; this improvement is dramatic.

The temperature and moisture dependent strength values are determined using the same procedures, but with the environment adjusted to the corresponding temperature and moisture conditions. This applies also to the accelerated aging test in which adhesion and strength values were determined after 20 minutes, 72 hours and 120 hours (5 days).

The inherent viscosity of the adhesive copolymers was measured on a solution of the copolymer in ethyl acetate at 20° C. and at a concentration of 0.15 g per 100 ml with a Cannon Fenske Viscosimeter No. 50.

The boiling points of solvents B are values measured at normal pressure and normal temperature; for pure solvents (i.e. no mixtures) they can be found in tables in standard physical chemistry literature. Also, the vapor pressure of solutions will decrease, resulting in higher boiling points as long as a dissolved substance is present. The boiling point of the (pure) solvents, solvent mixtures or solutions suited for component B is at least 75° C., preferably at least 80° C. A particularly suited group of solvents boils in the range of about 110° C. to 180° C.

The vapor pressure of the preferred solvents B should not exceed a maximum of 30 mbar (3 kPa) at 20° C.; in the case of systems incorporating dissolved solids, the known phenomenon of decreased vapor pressure must be taken into account.

To assess suitability for screen printing, a test was developed wherein the screen printing composition is printed onto a substrate under defined conditions and the "stringing" tendency and flow-out behavior of the composition were evaluated visually after 0 5 and 10 minutes. By means of this screen printing test, it was demonstrated that the solvent has decisive importance for the acrylate adhesive. Solvents having dipole moments of at least 1.0, preferably above 1.1 and most preferred above 1.3 are best suited for the inventive screen printing composition. This results clearly from the test series in the examples.

EXAMPLE 1

A monomer mixture consisting of 70 parts by weight of isooctylacrylate (380 millimoles), 22.5 parts by weight of methylacrylate (262 millimole) and 7.5 parts by weight of acrylic acid (104 millimoles) was dissolved in propyleneglycolmethyl ether (MOP) with a vapor pressure of 1.0 kPa (10 mbar) and a dipole moment of 1.67 Debye and was copolymerized under inititation with 0.3 % N,N'-azo-bis(isobutyronitrile) (AIBN) at a temperature of 50° C. for a period of 20 hours. The polymerization was continued only until the inherent viscosity of the copolymer solution had reached a level of less than about 1.0 dl/g, ensuring that the molecular weight of the polymer was sufficiently low and no pre-crosslinking took place. The solids content of the copolymer solution was on the order of 50%. A thermal crosslinking agent was added shortly before screen printing.

The copolymer solution was screen printed on a transparent polyethylene film at room temperature through a 32 meshes per centimeter screen with a mesh width of 190 μm. In the printing process, the composition did not "string" and flowout occurred within few minutes to form a smooth coating.

After the screen printing process, the assembly was dried and crosslinked in an oven at 80° C. for 10 minutes.

The finished screen print was tested as described below. The commercial products identified as comparison examples I and II (see above) were screen printed, heat treated and tested under the same conditions as the finished screen print.

COMPARISON EXAMPLES I and II

Comparison example I involves an SBR-SBS (styrene-butadiene) gum resin adhesive with an admixture of unknown tackifiers. The xylene-dissolved adhesive is offered by the Kissel and Wolf company under the trade name "TC 2000"; it was used for some time especially for the showershield application mentioned above. However, the characteristics of the SBR-SBS gum resin do not allow a satisfactory bonding strength to be maintained for an extended period of time at elevated temperatures.

Comparison example II involves an acrylate copolymer dispersed in an aqueous phase (trade name "Kiwoprint D 146/3", also by Kissel and Wolf).

A comparison of the figures in Table 1 shows clearly that the inventive screen printing compositions not only have a dramatically improved adhesive strength in shear but, that in addition, their temperature stability and their independence from the ambient humidity level are excellent. Additional test results are given in Tables 2 and 3.

EXAMPLES 2-4

The same acrylate adhesive as in Example 1 was admixed with various solvent mixtures of which the dipole moments decreased because of the mixing ratios. With a 23/77 (volume/ volume) MOP/xylene mixture having a dipole moment of 0.87 Debye, the corresponding screen printing composition showed a marked stringing tendency. The coated area (percentage) was so small after as little as 5 and 10 minutes that reasonable screen printing was not possible any more. A dipole moment higher than 1.1 Debye ensured best screen printing results. For details, see Table 4.

EXAMPLE 5

An acrylate adhesive of 90 mole percent isooctyl acrylate and 10 mole percent acrylic acid and having an inherent viscosity of 0.35 dl/g was prepared by copolymerization in propyleneglycolmethylether (MOP). The acrylate adhesive composition was dissolved in MOP to a 45 weight % solids content. The 180° peel adhesion on polished steel (PSTC-1 test) was as listed in Table 5.

The peel strength values after 5 days both at 70° C. and at 40° C. and high air humidity clearly are higher. In this respect, the inventive screen printing composition is substantially superior to a gum resin-based screen printing composition.

The static strength in shear was measured according to PSTC-7 (1.27 cm by 2.54 cm) with a 500 g weight and was 10,000 minutes at 50° C., 10,000 minutes at 70° C. and as much as 320 minutes at 120° C., while the gum resin-based commercial product failed immediately at that temperature. For this reason, the screen-printable adhesive of this example clearly can be considered a high-performance product.

EXAMPLES 6-8

A number of different acrylate adhesives with different amounts of (meth)acrylic acid monomer units were prepared and tested for suitability for screen printing compositions in propyleneglycolmethylether (MOP). Table 6 summarizes the results. Increasing amounts of acrylic acid enhance the screen printability in MOP.

The results in Table 6 show that acrylic acid and methacrylate are equally suited as copolymer component in suitable screen printing compositions. However, the absence of polar acrylic acid results in an inferiorly performing adhesive.

EXAMPLES 9-14

These examples demonstrate the significance of solvent B for the inventive screen printing compositions by means of a test series. The acrylate based adhesive in Example 9 was an IOA/AA adhesive (90/10) prepared as in Example 5, but polymerized in a 50/50 MOP/xylene solvent mixture.

Examples 10-13 contain the same terpolymer as Example 1 (IOA/MA/AA 70:22.5:7.5), but polymerized in the solvents given in Table 7.

Example 14 is an acrylate adhesive of the same basic composition as in Example 1, but polymerized in ethyl acetate to an inherent viscosity of 0.7 dl/g and dissolved in MOP after removal of the solvent. A UV crosslinking agent was polymerized into the adhesive Table 7 summarizes the screen printing results.

EXAMPLES 15-24

The acrylate adhesive of Example 14 was compounded in various different solvents to form a screen printing composition and was tested for suitability for screen printing uses. The dipole moment of the solvent turned out to have a decisive influence. Normally, solvents having vapor pressures above 3 kPa (30 mbar) are less suited for screen printing work under normal conditions.

The test results summarized in Table 8 show that screen printing compositions with MOP or EG are very good solvents and result in screen printing compositions which do not string nor give rise to flow-out problems on screen printed substrates. Systems with n-butanol and n-butylacetate are highly practicable compositions as well.

EXAMPLE 25

In this example, the acrylate adhesive of Example 5 had added thereto as a tackifier 20 wt. % (relative to the polymer solids) of a rosin ester (Hercules Foral 85). This composition showed no degradation of the screen printing properties and is suited particularly for low surface energy substrates.

TABLE 1

Adhesive Strength (Values in N/cm)

| | Example 1 | Comparison Examples I | II |
|---|---|---|---|
| 1 hour at RT | 5.0 | 9.6 | 1.0 |
| 24 hours at RT | 5.0 | 10.0 | 1.7 |
| 120 hours at 80° C. | 9.6 | 5.6 | 3.3 |
| 24 hours at 90° C. and 100° humidity | 5.0 | 7.6 | 1.5 |
| Static shear strength at 70° C. (minutes) | 10,000 | 28 | 1 |

TABLE 2

PSTC-1 Adhesion (Values in N/cm)

| | Example 1 | Comparison Examples I | II |
|---|---|---|---|
| 20 minutes at RT | 6.3 | 7.2 | 1.6 |
| 72 hours at 50° C. | 6.7 | 14.0 | 3.8 |
| 120 hours at 80° C. | 10.0 | 4.1 | 3.3 |
| 24 hours at 100% humidity and 40° C. | 6.3 | 5.7 | 0.9 |
| 5 days at 100% humidity and 40° C. | 6.8 | 7.9 | 0.1 |
| 4 weeks at 70° C. | 5.7 | 4.2 | — |

RT = room temperature

TABLE 3

PSTC-7 Shear Strength (Values in Minutes)

| T (°C.) | Example 1 | Comparison Examples I | II |
|---|---|---|---|
| 50 | 10,000 | 1,700 | 3 |
| 70 | 10,000 | 25 | 1 |
| 120 | 5,000 | 1 | 1 |

TABLE 4

Screen Printing Test With MOP/Xylene Mixtures

| Ex. | MOP/Xylene | Dipole Moment (Debye) | Stringing $t_0$ | $t_5$ | $t_{10}$ | Coated Surf. % $t_0$ | $t_5$ | $t_{10}$ |
|---|---|---|---|---|---|---|---|---|
| 1 | 100/0 | 1.67 | none | none | none | 100 | 100 | 100 |
| 2 | 50/50 | 1.15 | none | none | little | 100 | 100 | 100 |
| 3 | 40/60 | 1.05 | | little | much | 100 | 90 | 50 |
| 4 | 23/77 | 0.87 | | little | full surface | 100 | 85 | 10 |

$t_0$: screen printing immediately after adhesive application
$t_x$: screen printing x minutes after adhesive application

TABLE 5

(see Example 5)
PSTC-1 Adhesion (Values in N/cm)

| 20 minutes at RT | 4.5 |
|---|---|
| 3 days at 50° C. | 6.1 |
| 5 days at 70° C. | 8.6 |
| 5 days at 40° C. and 100% air humidity | 8.5 |

RT = room temperature

TABLE 6

| Ex. | Polymer Comp. (mat'l.) | (weight %) | Inherent Viscosity (dl/g) | Coated Surface (%) $t_0$ | $t_5$ | $t_{10}$ | $t_{15}$ | Stringing $t_0$ $t_5$ $t_{10}$ $t_{15}$ | Flowing $t_0$ | $t_5$ | $t_{10}$ | $t_{15}$ |
|---|---|---|---|---|---|---|---|---|---|---|---|---|
| 5 | IOA/AA | 90/100 | 0.35 | 100 | 100 | 100 | 100 | no strings | very good | very good | very good | very good |
| 6 | IOA/AA | 95/5 | 0.35 | 100 | 100 | 100 | 100 | no strings | good | good | good | mediocre |
| 7 | IOA/ | 100/0 | 0.35 | 100 | 100 | 90 | — | no strings | good | good | poor | — |
| 8 | IOA/MA | 75/25 | 0.37 | 100 | 100 | 100 | 100 | no strings | very good | very good | very good | very good |

$t_0$: screen printing immediately after adhesive application
$t_x$: screen printing x minutes after adhesive application

TABLE 7

| Ex. | Adhesive Composition | Inherent Viscosity (dl/g) | Solvent | Coated Surface (%) $t_0$ | $t_5$ | $t_{10}$ | Stringing $t_0$ | $t_5$ | $t_{10}$ | Flowing |
|---|---|---|---|---|---|---|---|---|---|---|
| 5 | IOA/AA (90/10) | 0.37 | MOP | 100 | 100 | 100 | | no strings | | excellent |
| 9 | IOA/AA (90/10) | 0.33 | MOP/Xylene 50/50 | 100 | 100 | 100 | | no strings | | excellent |
| 10 | IOA/MA/AA | 1.09 | acetone | 100 | 70 | — | little | yes | — | poor |
| 11 | IOA/MA/AA | 1.44 | acetone | 100 | 70 | — | little | yes | — | poor |
| 12 | IOA/MA/AA | 0.39 | MOP | 100 | 100 | 100 | | no strings | | good |
| 13 | IOA/MA/AA | 0.47 | MOP/Xylene | 100 | 100 | 100 | | no strings | | good |
| 14 | IOA/MA/AA | 0.7 | MOP | 100 | 100 | 100 | | no strings | | good |

$t_0$: screen printing immediately after adhesive application
$t_x$: screen printing x minutes after adhesive application

TABLE 8

| Ex. | Solvent | Vapor Pressure (mbar) | Dipole Moment (Debye) | Coated Surface (%) $t_0$ | $t_5$ | $t_{10}$ | $t_{15}$ | Flowing |
|---|---|---|---|---|---|---|---|---|
| 14 | MOP[1] | 10 | 1.67 | 100 | 100 | 100 | 100 | excellent |
| 15 | EG[2] | 5.0 | 1.69 | 100 | 100 | 100 | 100 | excellent |
| 16 | Toluene | 29.0 | 0.36 | 90 | — | — | — | poor |
| 17 | Xylene | 8.0 | 0.62 | 90 | — | — | — | poor |
| 18 | Ethylacetate | 97.0 | 1.78 | 100 | 20 | — | — | good |
| 19 | Isopropanol | 43 | 1.66 | 100 | 50 | — | — | good |
| 20 | n-Butanol | 6.7 | 1.66 | 100 | 100 | 100 | | good |
| 21 | n-Butylacetate | 13.0 | 1.86 | 100 | 100 | 100 | | good |
| 22 | Diethylether | 587.0 | 1.15 | 100 | — | — | — | unsuitable |
| 23 | Acetone | 233.0 | 2.88 | 100 | 100 | — | — | |
| 24 | Xylene (30% solids) | 8.0 | 0.62 | 100 | 90 | 70 | | forms strings & bubbles flows well |

$t_0$: screen printing immediately after adhesive application
$t_x$: screen printing x minutes after adhesive application
[1] propyleneglycolmethylether
[2] ethyleneglycolmethylether

What is claimed is:

1. Screen-printable acrylate pressure-sensitive adhesive composition suitable for adhesive products comprising a solution of
    about 25 to 225 parts by weight of at least one dissolved inherently tacky pressure-sensitive adhesive which is an essentially non-crosslinked acrylate polymer selected from (meth)acrylic acid ester/-(meth)acrylic acid copolymers which have an average molecular weight corresponding to an inherent viscosity of not more than 1.0 dl/g; and 100 parts by weight of an organic solvent or solvent mixture having a low partial vapor pressure of less than about 3 kPa (30 mbar) at 20° C. and a dipole moment of at least 1.0 Debye.

2. A composition as in claim 1, characterized in that the acrylate copolymer has structural units having the general formula

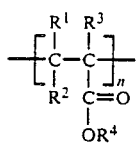

wherein $R^1$ and $R^2$ independently are hydrogen or lower alkyl having 1 to 4 carbon atoms, $R^3$ stands for hydrogen, a lower alkyl group having 1 to 4 carbon atoms or a cyano group, $R^4$ is hydrogen or an alkyl group having 1 to about 14 carbon atoms and n is the mean degree of polymerization.

3. A composition as in claim 1 characterized in that $R^4$ is a hydrogen atom in at least 5 weight percent of the total monomer units, at least one of the groups $R^1$ and $R^2$ optionally being a carboxyl having the formula $-C(=O)-OR^4$, and $R^3$ optionally being a methylene carboxyl group having the formula $-CH_2-C(=O)-OR^4$.

4. A composition as in claim 1 characterized in that said acrylate polymer contains a crosslinking component therein.

5. A composition as in claim 4 characterized in that said crosslinking component is a monoethylenically unsaturated monomer free from orthoaromatic hydroxyl groups.

6. A composition as in one of claim 1 characterized in that the acrylate polymer has been made by a radically initiated solution polymerization in a polar solvent.

7. A composition as in claim 6 characterized in that the acrylate polymer was made by radical solution polymerization in the same solvent B in which it was dissolved.

8. A composition as in claim 1 characterized by having a viscosity in the range of 100 to 7,500 Centipoise at the screen printing temperatures utilized.

9. A composition as in claim 1 characterized in that the composition contains a UV crosslinking agent or a thermal crosslinking agent.

10. A composition as in claim 1 characterized in that it additionally contains a tackifier in an amount of 20 to 80 parts by weight relative to 100 parts by weight of solvent, said tackifier being selected preferably from the group comprising the polyol rosin acid ester and hydrogenated rosin acid esters.

11. A composition as in claim 1 characterized in that it contains additives such as coloring matter, dyes and antioxidants.

12. A process of making the screen printable acrylate pressure-sensitive adhesive composition according to claim 1, characterized by radically polymerizing a monomer mixture to provide a polymer of group A in a solvent selected from group B, and then crosslinking the copolymer or the polymerized copolymer solution to form a pressure-sensitive adhesive.

13. A process as in claim 12 characterized in that the polymer of group A is isolated from solvent B and dried before crosslinking to form the pressure-sensitive adhesive.

14. A process as in claim 12 characterized by using as the solvent an alkyleneglycol diether or an alkyleneglycol monoether having 2 to 6 carbon atoms in the alkylene group, preferably isopropanediol monomethylether.

15. A screen printed substrate having a screen print of a pressure-sensitive adhesive composition as specified in claim 1 applied to at least a portion of its surface, wherein said pressure-sensitive adhesive composition has been dried and crosslinked and wherein the coat of adhesive has a peel strength of 4 to 20 N/cm and an adhesion in shear higher than 10,000 minutes at temperatures ranging from room temperature to 120° C.

16. A screen printed substrate having a screen print of a pressure-sensitive adhesive composition as specified in claim 1 applied to at least a portion of its surface, wherein said pressure sensitive adhesive composition has been dried and crosslinked and wherein the water or humidity resistance of the cross-linked pressure-sensitive adhesive is high enough to produce peel strengths in the range of 4 to 20 N/cm in the long-term test at 100% humidity.

17. A screen-printable acrylate pressure-sensitive adhesive composition comprising a solid essentially non-crosslinked acrylate copolymer dissolved in a polar, low molecular weight solvent wherein:
A) said acrylate copolymer has an inherent viscosity of less than 1.0 dl/g, and
B) said polar solvent has a partial vapor pressure of less than 3 kPa (30 mbar) at 20° C. and a dipole moment of at least 1 Debye.

18. A screen-printable pressure-sensitive adhesive composition comprising a solution of (a) from 20 to 225 parts by weight of a non-crosslinked (meth)acrylic acid ester/(meth)acrylic acid copolymer having an inherent viscosity of 1 dl/g or less, and (b) 100 parts by weight of a polar organic solvent having a partial vapor pressure of less than about 3 kPa (30 mbar) at 20° C. and a dipole moment of 1 Debye or more.

19. A screen-printable adhesive composition according to claim 1 which does not string when screen printed.

* * * * *

UNITED STATES PATENT AND TRADEMARK OFFICE
CERTIFICATE OF CORRECTION

PATENT NO. : 5,141,989

DATED : August 25, 1992

INVENTOR(S) : Dieter Jung, Katharina J. Bishop, Kai Grimmel, and Robert R. L. Smolders It is certified that error appears in the above-identified patent and that said Letters Patent is hereby corrected as shown below:

Col. 3, line 68 "(AsS)" should read --(ABS)--.

Col. 11, line 54, "0 5" should read --0.5--.

Col. 13, line 48, after "adhesive", insert --.--.

Signed and Sealed this

Ninth Day of November, 1993

BRUCE LEHMAN

*Attest:*

*Attesting Officer*    Commissioner of Patents and Trademarks